Jan. 25, 1938.  E. E. HEWITT  2,106,483
BRAKE SYSTEM
Filed Oct. 15, 1936  5 Sheets-Sheet 3

INVENTOR
ELLIS E HEWITT.
BY Wm. M. Cady
ATTORNEY

Jan. 25, 1938.    E. E. HEWITT    2,106,483
BRAKE SYSTEM
Filed Oct. 15, 1936    5 Sheets-Sheet 4

INVENTOR
ELLIS E HEWITT.
BY *Wm. N. Cady*
ATTORNEY

Jan. 25, 1938.  E. E. HEWITT  2,106,483
BRAKE SYSTEM
Filed Oct. 15, 1936  5 Sheets-Sheet 5
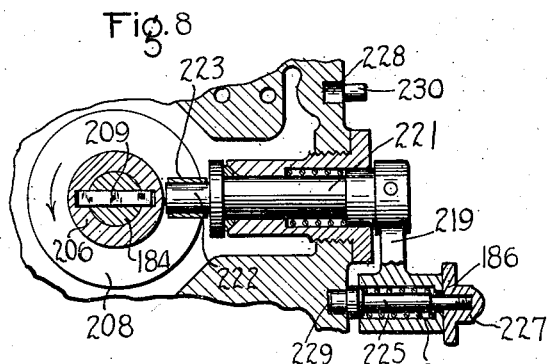
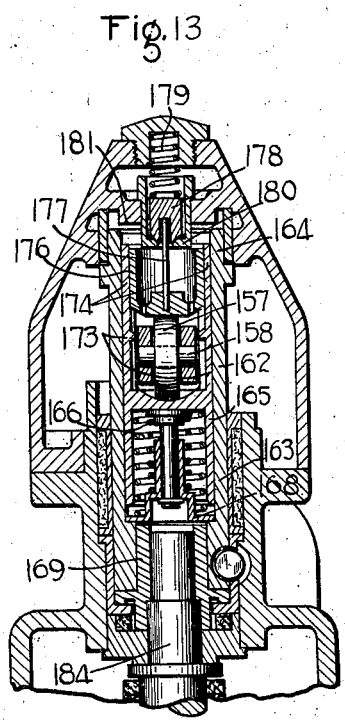
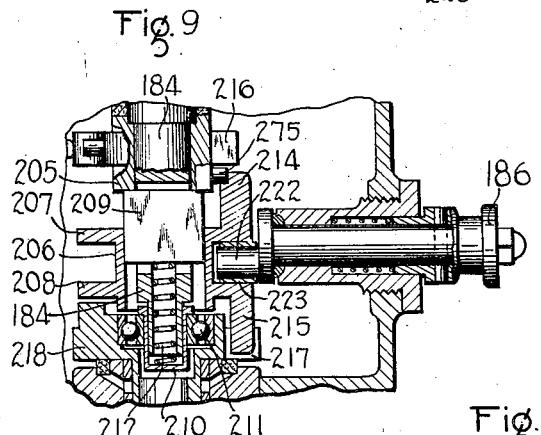
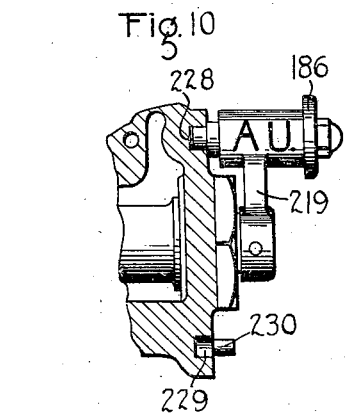
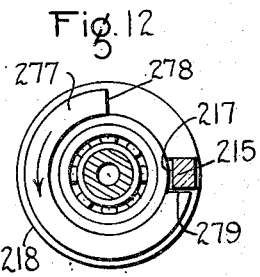
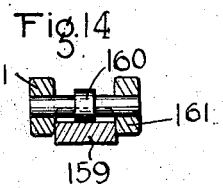
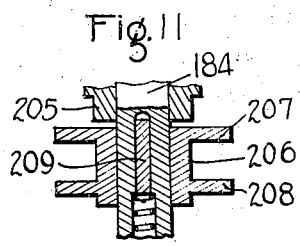
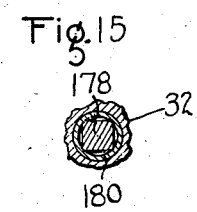
INVENTOR
ELLIS E HEWITT.
BY Wm. M. Cady
ATTORNEY Patented Jan. 25, 1938

2,106,483

UNITED STATES PATENT OFFICE 2,106,483

BRAKE SYSTEM

Ellis E. Hewitt, Edgewood, Pa., assignor to The Westinghouse Air Brake Company, Wilmerding, Pa., a corporation of Pennsylvania Application October 15, 1936, Serial No. 105,659

27 Claims. (Cl. 303—15)

This invention relates to brake systems, and more particularly to brake systems for high speed railway trains.

With the recent development of light-weight passenger trains for operation at extremely high speeds, as for example speeds of one hundred miles per hour or more, the need for a brake system which provides for a high degree of flexibility coupled with simplicity of control by an operator becomes of great importance. The brake systems at present used on such trains comprise a dual control arrangement, whereby applications of the brakes may be effected by either straight air operation or automatic operation.

It is highly desirable that the brake valve device provided for controlling both modes of operation be as simple as possible and so arranged that both straight air operation and automatic operation may be controlled by movement of the brake valve handle in the same zone. It is further desirable that this zone require only small angular movements, so as to reduce the degree of manipulation required by the operator in effecting applications and release of the brakes, and in graduating applications.

It is a principal object of the present invention to provide an improved brake system in which both straight air and automatic applications of the brakes may be selectively controlled in response to the same movement of the brake valve handle in a single application zone.

It is a further object of the invention to provide an improved brake valve device for carrying out the foregoing object.

In the brake systems for high speed trains heretofore proposed, normal service applications of the brakes are effected by straight air application, but in the event that the straight air application does not materialize to a predetermined degree in a chosen length of time, following movement of the brake valve handle to a service application position, then an insuring means operates to effect the application by automatic operation. It is a further object of this invention to provide an improved means for insuring an application of the brakes by one or the other of the two modes of operation, in response to movement of the brake valve handle to a service application position.

Yet further objects of the invention, dealing with specific constructions of parts and arrangements of devices, will be more fully understood from the following description of an embodiment of the invention, wherein, Fig. 1 shows in schematic and diagrammatic form an embodiment for the head end or control car of a train.

Fig. 4 is a diagrammatic representation of the ports and communications established by the rotary valve in the brake valve device of Fig. 2.

Figure 2:
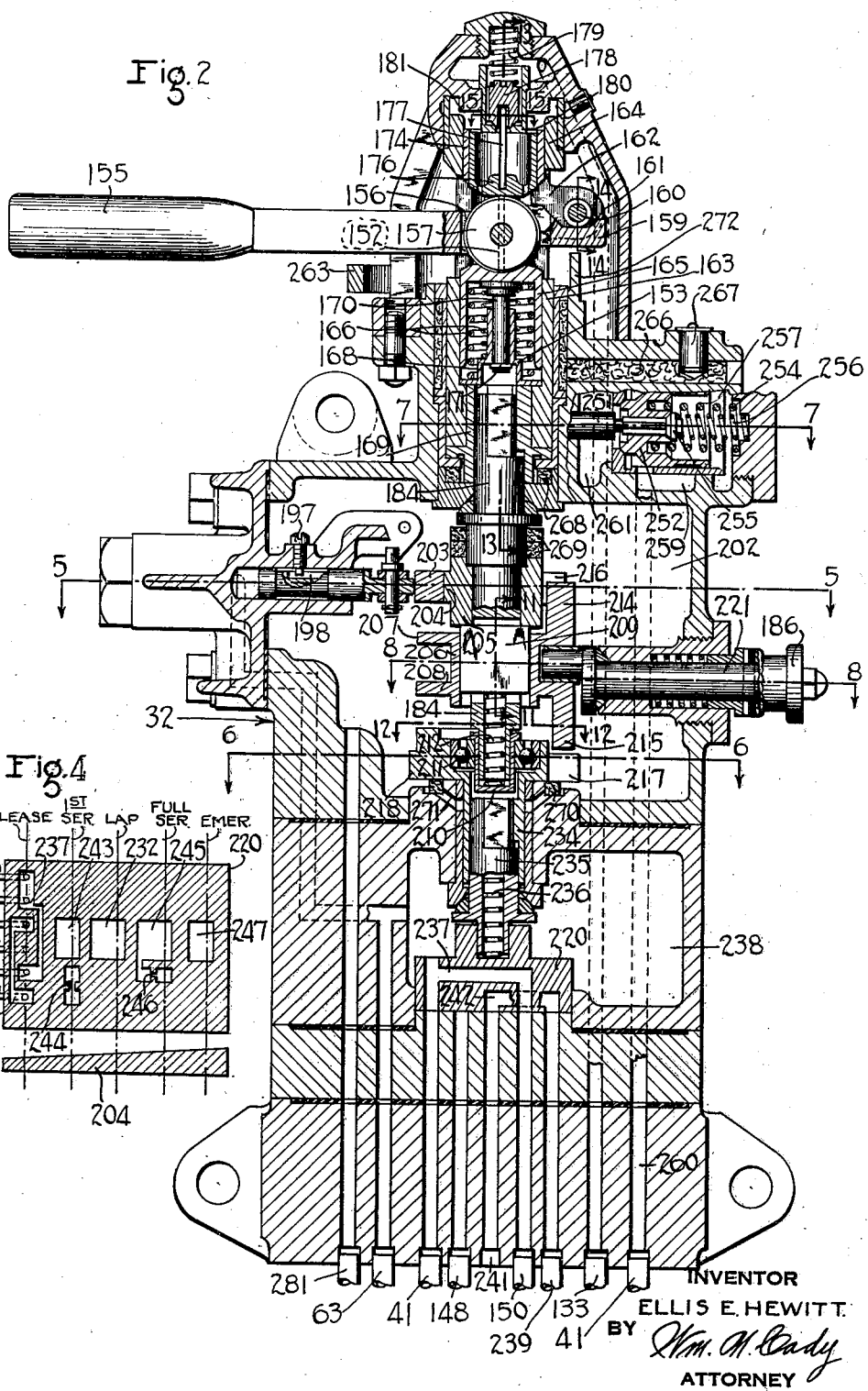
Fig. 2 is a diagrammatic sectional view of the improved form of brake valve device employed in the system shown in Fig. 1.

Figs. 7, 8 and 11 to 15, inclusive, are detail sectional views taken respectively along the lines 7—7, 8—8, 11—11, 12—12, 13—13, 14—14, and 15—15, of Fig. 2.

Figs. 9 and 10 are detail views of portions of the selector mechanism.

Figure 1:
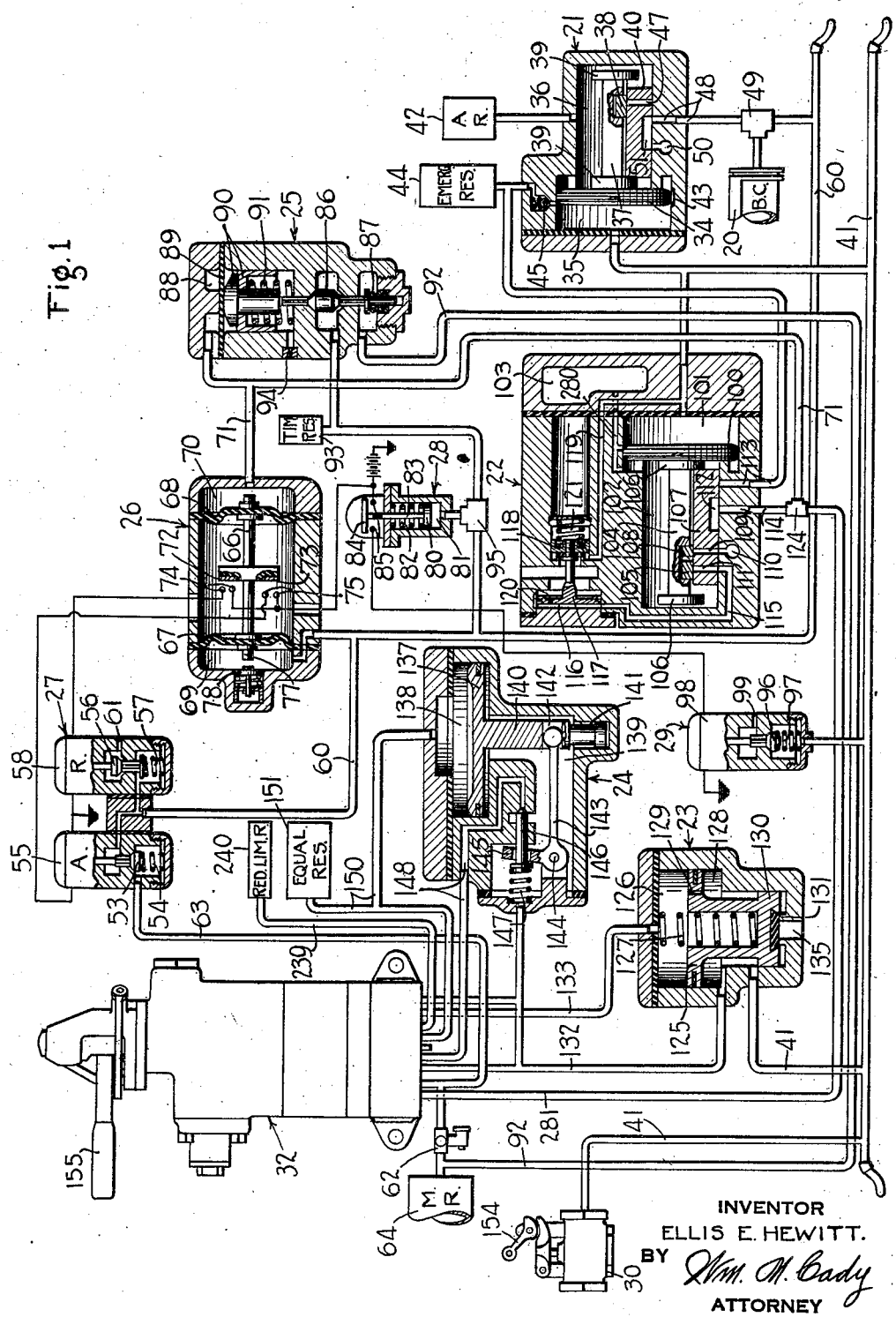

Referring now first to the brake system shown in Fig. 1, a single brake cylinder is shown at 20, although as many of these may be employed as are desirable and necessary, an automatic valve device is shown at 21, an emergency valve device at 22, a safety control vent valve device at 23, an equalizing discharge valve device at 24, a relay valve device at 25, a master switch device at 26, an application and release magnet valve device at 27, a timing switch device at 28, an application insuring magnet valve device at 29, a conductor's valve device at 30, and an improved form of brake valve device embodying features of my invention at 32. The various reservoirs supplied will be referred to later.

Considering now these devices in detail, the automatic valve device 21 is embodied in a casing having disposed therein a piston 34 subject on one side to the pressure of fluid in a chamber 35, and on the other side to the pressure of fluid in a chamber 36. The piston 34 is provided with a stem 37, which is recessed to receive, and move coextensive with movement of the piston, a graduating slide valve 38. The stem 37 is provided with collars 39 for engaging a main slide valve 40 after a lost motion movement of the piston 34.

The piston chamber 35 is in open communication with a brake pipe 41, which, as in all standard brake systems, extends throughout the train. The slide valve chamber 36 is in open communication with an auxiliary reservoir 42. The parts of the automatic valve device 21 are illustrated in their release position, in which position the auxiliary reservoir 42 is charged from the brake pipe 41 by way of feed groove 43. At the same time, an emergency reservoir 44 is also charged from the brake pipe 41 by way of a spring loaded check valve 45.

Upon a service reduction of pressure in the brake pipe 41 and piston chamber 35, the overbalancing pressure in the slide valve chamber 36 will shift the piston 34 to the left, and for the first movement of the piston the graduating valve 38 uncovers a service port 47 in the main slide valve 40, and the piston then shifts the main slide valve to the position where the service port registers with pipe and passage 48.

At the same time, the piston 34 closes communication between the chamber 35 and each of the auxiliary reservoir 42 and emergency reservoir 44, as will be obvious from the arrangement shown. Fluid under pressure will in the service position of the slide valve 40 flow from the slide valve chamber 36, and auxiliary reservoir 42, to pipe and passage 48, and from thence by way of double check valve device 49 to the brake cylinder 20, the double check valve device being of the usual design and operating in the usual way to open this communication. The graduating slide valve 38 will lap the service port when brake cylinder pressure corresponds to the degree of brake pipe reduction.

Upon an emergency reduction of pressure in the brake pipe 41 and piston chamber 35, the piston 34 will be shifted to its extreme position to the left where the main slide valve 40 uncovers the passage 48, to permit the auxiliary reservoir 42 to equalize with the brake cylinder 20. Upon a restoration of pressure in the brake pipe 41 and piston chamber 35, the piston 34 will move back to the release position and vent the brake cylinder 20 to the atmosphere by way of the communication formed between pipe and passage 48 and exhaust port 50 through the cavity 51 in the main slide valve 40.

The application and release magnet valve device 27 is embodied in a casing having disposed therein a supply valve 53, urged toward a seated position by a spring 54 and toward an unseated position by an electromagnet 55 when energized. Also disposed in the valve device casing is a release valve 56, which is urged toward an unseated position by a spring 57 and toward a seated position by an electromagnet 58 when energized.

When the supply valve 53 is in seated position, and the release valve 56 is in unseated position, a straight air pipe 60 is in communication with the atmosphere by way of an exhaust port 61 in the application and release magnet valve device. When the release valve 56 is seated, and the supply valve 53 is unseated, the straight air pipe 60 is connected to a feed valve device 62, by way of the unseated supply valve 53 and a feed valve pipe 63.

The feed valve device 62 is of conventional design and is connected to a main reservoir 64, the function of the feed valve device being to supply fluid under pressure from the main reservoir to the feed valve pipe 63 at a substantially constant pressure. The main reservoir 64 is of course connected to the usual compressor (not shown) and is thereby maintained charged with fluid under pressure to some value higher than the feed valve setting.

It will be observed that the straight air pipe 60 is connected to one side of the aforementioned double check valve device 49, so that when fluid under pressure is supplied to the straight air pipe the double check valve device will shift to open communication between the straight air pipe and the brake cylinder 20. If at the same time fluid under pressure is supplied to the aforementioned pipe 48, it will be obvious that the double check valve device 49 will function to permit fluid to be supplied to the brake cylinder from either the straight air pipe 60 or from the pipe 48, depending upon in which of the two pipes the pressure of the fluid is the greater.

The master switch device 26 controls operation of the application and release magnet valve device 27, and is embodied in a casing having disposed in spaced relationship, and connected by a stem 66, two flexible diaphragms 67 and 68, which two diaphragms form pressure tight chambers 69 and 70. The chamber 69 is connected to the straight air pipe 60, while the chamber 70 is connected to a control pipe 71.

Disposed on and rigidly connected to the stem 66, and insulated therefrom, are two contact members 72 and 73. The contact member 72 is adapted upon movement of the stem 66 to the left to engage two stationary contacts 74, which are shown in diagrammatic form but which are to be understood as being resilient contacts which yield upon engagement by the contact 72. The contact 73 is adapted to engage two similar stationary contacts 75.

The parts of the switch device are normally positioned as illustrated, and the switch device is adapted to be operated upon supply of fluid under pressure to the chamber 70. As pressure builds up in the chamber 70 the two diaphragms 67 and 68, and also the stem 66, are actuated to the left. Upon a predetermined movement of the stem 66 to the left, contact 72 engages and bridges the two contacts 74, at which time the end 77 of the stem 66 engages a graduating stop 78, which tends to arrest the movement of the stem 66 in this position. If the pressure in the chamber 70 is sufficiently great the stem will continue to move to the left compressing the spring stop 78, and causing contact 73 to engage the contacts 75.

Engagement of contact 72 with contacts 74 energizes the release electromagnet 58 in the application and release magnet valve device 27, to close communication between the straight air pipe 60 and the atmosphere, as previously described, while engagement of contact 73 with contacts 75 energizes the application electromagnet 55, to effect a supply of fluid under pressure to the straight air pipe 60, as also previously described.

When the pressure in the straight air pipe 60, and consequently that in the chamber 69, becomes substantially equal to the pressure established in the chamber 70, the two diaphragms 67 and 68, and the stem 66, will be actuated to a position where contact 73 has disengaged from the contacts 75, but where contact 72 is still in engagement with the contacts 74. The supply of fluid under pressure to the straight air pipe 60 will be then lapped. As will be more fully understood from the description of operation which follows presently, electropneumatic or straight air applications of the brakes may be controlled by controlling operation of the master switch device 26.

The timing switch device 28 is embodied in a casing having disposed therein a piston 80 subject on one side to the pressure of fluid in a chamber 81, and on the other side to the pressure of a spring 82. Attached to the piston 80 is a stem 83 which at its opposite end carries a contact 84, insulated from the stem, which contact is adapted to engage and bridge two stationary contacts 85. The contacts 84 and 85 control energization of the application insuring magnet valve device 29, as will be described presently.

The relay valve device 25 is embodied in a casing having disposed in a chamber therein a double beat valve 86, which valve is urged toward an upper seated position by a spring 87, and to a lower seated position upon supply of fluid under pressure to a chamber 88. The pressure of this fluid acts upon a diaphragm 89, which, through members 90, shifts the double beat valve to its lower position. A spring 91 biases the diaphragm 89 normally to its upper position.

When the double beat valve 86 is in upper seated position, a communication is established between a main reservoir pipe 92, connected directly to the main reservoir 64, and a timing reservoir 93. When the double beat valve 86 is in lower seated position, this communication is cut off and the timing reservoir is connected to the atmosphere by way of a small choke port 94. The size of this port is selected to permit the pressure in the timing reservoir to diminish at a predetermined rate.

As is illustrated, the timing reservoir is connected to one side of a double check valve device 95, the other side of the double check valve device being connected to the straight air pipe 60. The outlet connection of the double check valve device is connected to the chamber 81 of the aforedescribed timing switch device 28. It will thus be apparent that fluid under pressure may be supplied to the chamber 81 from either the straight air pipe 60 or from the timing reservoir 93. The purpose of this arrangement will be clear as the description proceeds further.

The application insuring magnet valve device 29 is embodied in a casing having disposed therein a valve 96, which is urged toward a seated position by a spring 97 and toward an unseated position by an electromagnet 98 when energized. When the valve 96 is unseated, a communication is established between the brake pipe 41 and an exhaust port 99, but so long as the valve 96 is held seated this communication remains closed.

The emergency valve device 22 has as one of its operating parts a piston 100 subject on one side to the pressure of fluid in a chamber 101, which is connected to the brake pipe 41, and subject on its other side to pressure of fluid in a slide valve chamber 102 and quick action chamber 103. The piston 100 is provided with a stem 104, which is recessed to receive and move coextensive with movement of the piston 100 a graduating valve 105, and which has collars 106 so arranged as to engage and move after a lost motion movement of the piston a main slide valve 107.

Upon a service rate of reduction of pressure in the brake pipe 41 and chamber 101, the piston 100 will move to the right far enough for a small port 108 in the graduating valve 105 to register with a port 109 in the main slide valve, which at this time registers with an exhaust port 110. The size of the port 108 is such that the pressure in the slide valve chamber 102, and quick action chamber 103, will reduce at substantially the same rate as the pressure in chamber 100 reduces during a service rate of reduction in brake pipe pressure. The piston 100 will thus be arrested in this position.

Upon an emergency rate of reduction of pressure in the brake pipe 41 and chamber 101, the piston 100 will be shifted the extreme distance to the right, the graduating valve 105 first blanking the main slide valve port 109 and uncovering main slide valve port 111, and the piston then shifting the main slide valve 107 to a position where cavity 112 therein connects pipe and passage 113 with pipe and passage 114. The main slide valve also uncovers a passage 115, which leads to a piston chamber 116.

Fluid under pressure will then flow from the slide valve chamber 102 and quick action chamber 103 to the piston chamber 116, actuating piston 117 to the right, and thus unseating a vent valve 118. Unseating of the vent valve 118 opens a large communication between the brake pipe 41 and the atmosphere, by way of passage 119. Eventually the pressure in the slide valve chamber 102 and quick action chamber 103 will be diminished to atmospheric pressure by virtue of leakage through a small port 120 in the piston 117, and as a consequence spring 121 will return the vent valve 118 to seated position. By this time, however, brake pipe pressure will have been depleted substantially to atmospheric pressure.

Upon a restoration of brake pipe pressure, following closing of the vent valve 118, the piston 100 will be shifted to the illustrated or release position, whereupon the parts will assume the positions shown in the drawings. It will be noted, however, that when the slide valve cavity 112 connected the pipe and passage 113 to the pipe and passage 114, the emergency reservoir 44 was placed in communication with a double check valve device 124, which valve device would then open a communication to the control pipe 71, permitting fluid under pressure to flow from the emergency reservoir 44 to chamber 70 in the master switch device 26, and also to chamber 88 in the relay valve device 25.

The safety control vent valve device 23 is embodied in a casing having disposed therein a piston 125, subject on one side to the combined pressure of fluid in a chamber 126 and that of a spring 127, and subject on the other side to pressure of fluid in a chamber 128. A small port 129 in the piston permits the fluid pressure in the two chambers 126 and 128 to normally equalize, so that the spring 127 is effective in shifting the piston 125 to its lowermost position. Attached to the piston 125 is a valve 130, which is held upon a seat rib 131 when the pressures in the two chambers 126 and 128 are equalized.

In the lowermost position of the piston 125 a communication is established between the brake pipe 41 and a charging pipe 132. The chamber 126 is connected to a safety control pipe 133, and upon depletion of pressure in this pipe the overbalancing pressure in the chamber 128 will shift the piston 125 to its upper position, where communication between the charging pipe 132 and brake pipe 41 is cut off, and the brake pipe 41 is vented to the atmosphere through a large exhaust port 135. This rapidly reduces the brake pipe pressure, to cause an emergency application of the brakes as will hereinafter be described.

The equalizing discharge valve device is embodied in a casing having disposed therein a piston 137, subject on its uppermost side to pressure of fluid in a chamber 138, and on its lowermost side to pressure of fluid in a chamber 139. Attached to the piston 137 is a stem 140 having one end thereof slidable in a bore 141. The stem 140 is recessed at 142 to receive the end of a lever 143. The lever 143 is pivotally mounted at 144, and has an extension 145 for operating a vent valve 146. The vent valve 146 is normally biased to a seated position by a spring 147, but upon counterclockwise rotation of the lever 143, about its pivot 144, the vent valve 146 is unseated to open communication between the chamber 139 and a passage 148 leading to the brake valve device 32.

The chamber 138 is connected by way of pipe 150 to an equalizing reservoir 151. The pipe 150 also leads to the brake valve device 32. Operation of the equalizing discharge valve device is effected by reducing the pressure of fluid in the equalizing reservoir 151 and chamber 138, whereupon the piston 137 will be shifted upwardly due to the overbalancing pressure of fluid in the chamber 139. The upward movement of the piston 137 rocks the lever 143 in a counterclockwise direction about the pivot 144 to unseat the vent valve 146. As will appear more clearly later, unseating of the vent valve 146 reduces the pressure in the chamber 139 until the pressure therein corresponds substantially to the pressure in the chamber 138 and equalizing reservoir 151, whereupon the piston 137 returns to the illustrated position to permit seating of the vent valve 146 by its spring 147. Since the chamber 139 is connected to the brake pipe 41 by way of charging pipe 132 and the communication through the safety control vent valve device 23, it follows that reductions in brake pipe pressure may be controlled by effecting suitable reductions of pressure in the equalizing reservoir 151 and chamber 138.

The conductor's valve device 30 is preferably of conventional design, having disposed therein a normally seated valve which is adapted to be unseated upon rotation of a lever 154 in a clockwise direction. When the valve is unseated a communication is established between the brake pipe 41 and the atmosphere, and when the valve is seated this communication is closed.

Coming now to the improved form of brake valve device, shown at 32 and illustrated in detail in Figs. 2 to 15 inclusive, the brake valve device comprises a number of interrelated parts preferably assembled in a convenient casing, and operated by manipulation of a single handle 155. The handle 155 is, as illustrated particularly in Figs. 2 and 13, slotted at 156 to receive a roller 157, which is held in place by a pin 158 passing through the roller and the two sides of the slot 156. A retaining pin 152 passes through the roller 157 and pin 158 to insure that the parts will remain in place.

The innermost end of the handle 155 is provided with a cup-shaped extension 159, which interfits with a retaining member 160 (see Fig. 14) carried by two lugs 161 projecting from a rotatable member 162. As is clearly shown in Figs. 2 and 13, the rotatable member 162 comprises a lower sleeve bearing 163 and an upper sleeve bearing 164.

Disposed within the lower sleeve bearing 163 is a spring cage member 165 having disposed therein two springs 166, which urge the spring cage 165 upwardly. The two springs 166 react against the brake valve casing, through a centering member 168 and bushing 169.

The handle 155 is normally held in a horizontal position, as illustrated in Fig. 2, by downward pressure manually applied by an operator. In this position of the handle the pressure applied by the operator is that necessary to overcome the outer spring 166 only. The inner spring 166 is not effective for this position of the handle, due to the fact that it reacts between the head of a pin 170 and a shoulder 153 on the centering member 168, which two members at this time are not relatively movable in the direction urged by the spring, due to the collar 171 on the lower end of the pin 170 striking a lower surface of the member 168. The purpose of this arrangement is to permit the operator to "feel" the horizontal position of the lever as it is moved downwardly because when the handle reaches the horizontal position an attempt to move it further is resisted by both springs 166.

Extending upwardly from the spring cage 165 are two side members 173 terminating in a sleeve 174 disposed within the upper sleeve bearing member 164. Within the sleeve 174 is a movable abutment, or cup-shaped member, 176. As may be seen from Figs. 2 and 13, this member 176 bears upon the handle roller 157.

A small pin 177 mounted vertically in the abutment 176 extends upwardly into a recess in a safety control vent valve 178. The valve 178 is held upon a seat by a spring 179, which at the same time maintains the abutment 176 in contact with the handle roller 157. The seat for the vent valve 178 is formed by a bushing 180 suitably secured in the brake valve casing. It will be apparent from the arrangement shown and described, that if the operator releases the pressure manually applied to the handle 155, the outer spring 166 will cause the handle to swing upwardly, it fulcruming about the member 160 and moving upwardly until the sleeve 174 strikes stop 181. This upward movement of the handle will unseat the vent valve 178 and hold it unseated so long as the handle is in the upper position. The unseating of the valve 178 will effect an emergency application of the brakes, as will be described later. This arrangement, whereby release of pressure manually applied to the handle 155 effects an emergency application, constitutes a safety control feature of the brake valve device.

The handle 155 may be rotated in a horizontal plane and will rotate the rotatable member 162 coextensive therewith. This is accomplished by virtue of the fact that the extension 159 fits snugly between the two lugs 161 (see Fig. 14), as does the outer side walls of the handle, adjacent the slot 156, with the two side members 173 (see Fig. 13).

Figure 7:
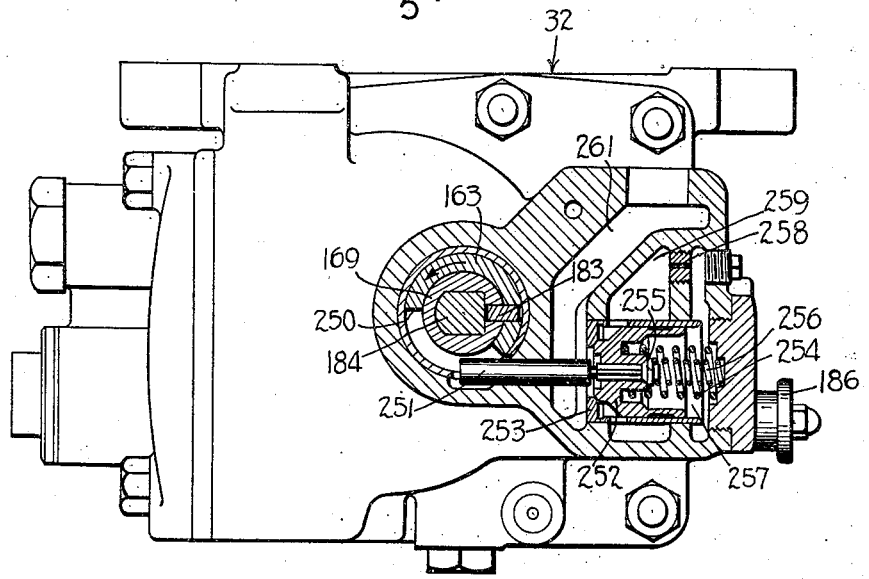

As shown in Fig. 7, the lower bearing member 163 of the rotatable member 162 is keyed to the bushing 169 by a key 183, so that the bushing member 169 rotates with the rotatable member. The bushing 169 is disposed on a shaft 184 in such a manner that as the bushing member turns the shaft also turns.

Figure 3:
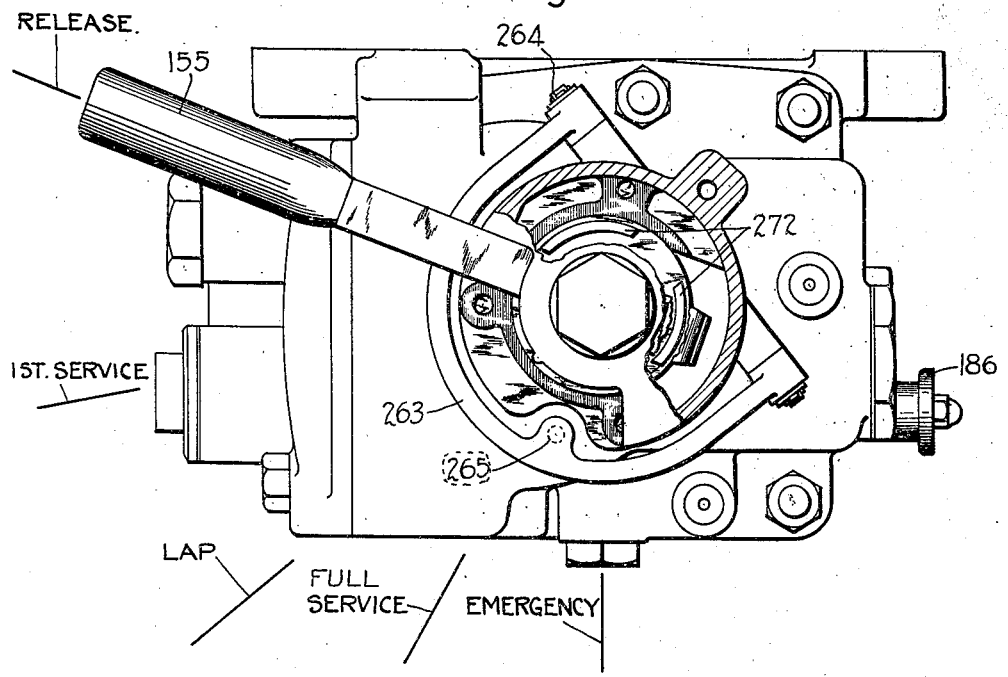
Fig. 3 is a top view of the brake valve device of Fig. 2, with a portion of the casing cut away to show certain interior features.

Referring now to Fig. 3, the handle 155 is illustrated as having a release position, a first service position, a lap position, a full service position and an emergency position. These are the specific positions to which the handle may be moved in controlling automatic applications of the brakes, but it is to be understood that the handle is moved in the zone between the release and full service positions in controlling straight air (electro-pneumatic) applications of the brakes.

The handle 155 may thus control the brakes either by straight air operation or by automatic operation for the same zone of movement, depending upon whether a selector 186 is in a "straight air" position (see Fig. 5), or in an "automatic" position (see Fig. 10). In its straight air position the selector 186 operates a clutch to connect the shaft 184 to a self-lapping valve mechanism within the brake valve device, while in its automatic position the selector connects the shaft to operate a rotary valve also within the brake valve device.

Figure 5:
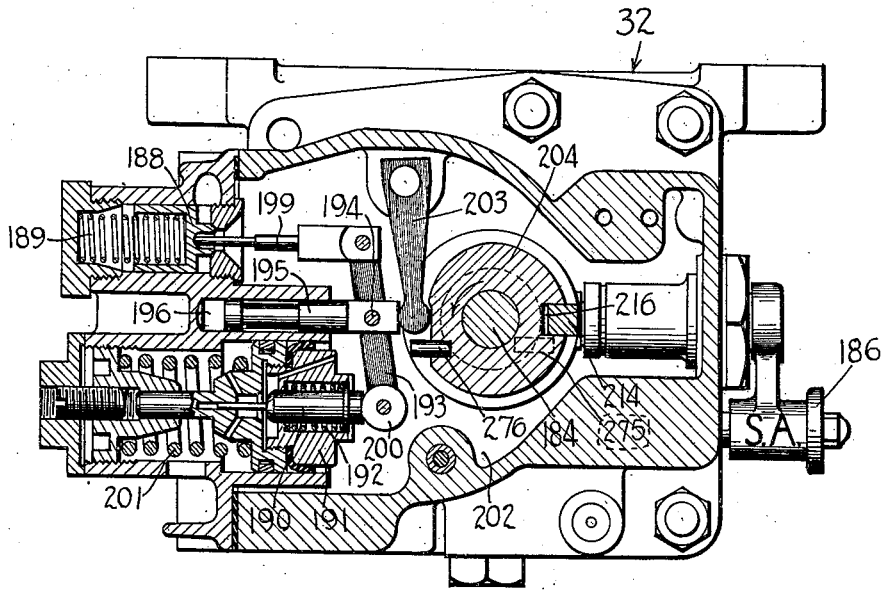
Fig. 5 is a sectional view taken along the line 5—5 of Fig. 2.
Figure 6:
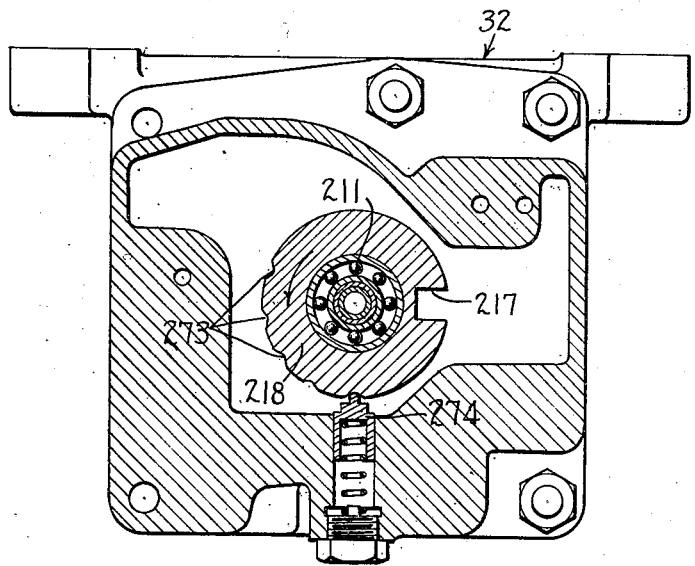
Fig. 6 is a sectional view taken along the line 6—6 of Fig. 2.

The self-lapping valve mechanism, shown best in Fig. 5, comprises a supply valve 188 urged toward a seated position by a spring 189, and a release valve 190 disposed within and carried by a movable abutment 191 in the form of a piston. The release valve 190 is urged toward unseated position by a spring 192.

For operating the supply valve 188 and release valve 190, there is provided a lever mechanism comprising spaced levers 193, carried by and pivotally mounted intermediate their ends at 194, to a plunger 195. The plunger 195 is slidably disposed in a bore 196 in the brake valve casing. A set screw 197 projects into a recess 198 in the plunger 195 to retain the plunger in the bore.

Between the upper ends of the spaced levers 193 is carried a stem 199 which projects into a recess in the supply valve 188. Between the lower ends of the spaced levers 193 is carried a roller 200 which engages the outermost end of the release valve 190.

The parts are illustrated in Fig. 5 in their release position. When the plunger 195 is actuated to the left the spaced levers 193 fulcrum about their upper ends and rotate in a clockwise direction to seat the release valve 190, the release valve spring 192 being a weaker spring than the supply valve spring 189. After the release valve is thus seated the spaced levers fulcrum about their lower ends to unseat the supply valve 188.

Now the movable abutment 191 is subject on its left hand side to the pressure of a strong spring 201 and on its right hand side to the pressure of fluid supplied to a chamber 202. During the aforedescribed operation of the supply and release valves the spring 201 is not appreciably compressed, but when the supply valve 188 is unseated and fluid under pressure is supplied to the chamber 202, the pressure of this fluid acts on the movable abutment 191 and compresses the spring 201 progressively as the pressure in the chamber 202 increases. As the movable abutment 191 moves to the left, the spaced levers 193 fulcrum about the pin 194 and rock in a clockwise direction until the supply valve 188 is seated. The supply of fluid under pressure to the pressure chamber 202 will be then lapped.

The pressure at which the supply to the chamber 202 is lapped depends upon the degree of movement of the plunger 195 to the left. For moving this plunger to the left there is provided a finger 203 engaging the end of the plunger and a cam 204 for forcing the finger 203 against the plunger. The periphery of the cam 204 is such that when it is rotated in a counterclockwise direction, as viewed in Fig. 5, the plunger 195 is progressively moved to the left.

The cam 204 is loosely disposed on but it is adapted to be rotated by the shaft 184 when the selector 186 is in the straight air position. It is to be here understood that when the cam 204 is thus rotated it progressively shifts the plunger 195 from its extreme right hand position to its extreme left hand position while the handle 155 is being moved from the release position indicated in Fig. 3 to the emergency position.

The clutch mechanism which connects the cam 204 to the shaft 184 comprises the following parts. Disposed on the shaft 184 is a clutch sleeve member 206 having projecting radially therefrom spaced flanges 207 and 208 (see Figs. 2, 8, 9 and 11). The sleeve 206 is keyed to the shaft 184 by a key 209. The lower end of the shaft 184 is reduced in size and nests within a cup member 210 disposed within a ball bearing 211. A spring 212 reacts between the bottom of the cup member 210 and the lower edge of the key 209 to hold the key in engagement with a shoulder 205 on the cam 204 and thus maintain the cam in a predetermined position loosely on the shaft 184.

Forming a part of the sleeve member 206 are an upper lug 214 and a lower lug 215. The upper lug 214 is adapted to innerfit with a recess 216 in the cam 204, while the lower lug 215 is adapted to innerfit with a recess 217 in a rotary member 218, which, as will be presently described, rotates coextensive therewith a rotary valve 220.

The clutch sleeve member 206 is shiftable between an upper position where the lug 214 fits into the recess 216 of cam 204 and a lower position where the lug 214 passes out of the recess 216 and the lug 215 passes into the recess 217. The shifting of the sleeve member 206 between these two positions is accomplished by the selector 186. The selector comprises essentially a small arm 219 keyed to a shaft 221, which has suitably combined therewith an eccentrically arranged pin 222. The eccentric pin 222 has disposed thereon a bushing 223 which fits between the two flanges 207 and 208 of the clutch sleeve 206.

In the handle of the selector 186 is a small plunger 225 urged outwardly of the handle by a spring 226 (see Fig. 8). The plunger is attached to a cap 227 which may be used to pull the plunger 225 into the handle. The end of the plunger 225 projects into a recess 228 in the brake valve casing when the selector is in the automatic position, and into a recess 229 when the selector is in the straight air position. Pins 230 act as stops when the end of the plunger 225 comes adjacent one or the other of the two recesses 228 and 229.

When the selector 186 is in the straight air position, the clutch sleeve member 206 will be positioned as shown in Fig. 2, and when the selector is in the automatic position, the sleeve member 206 will be positioned as shown in Fig. 9.

When the selector 186 is in the automatic position, the self-lapping valve mechanism cam 204 will be declutched from the shaft 184, while the rotatable member 218 will be clutched to the shaft. The rotatable member 218 operates the rotary valve 220 through the following connections. The rotatable member 218 has a sleeve portion 234 keyed to a shaft 235, through the same arrangement as shown between the parts 169 and 184 in Fig. 7. Thus as the rotatable member 218 rotates, the shaft 235 rotates coextensively therewith. The shaft 235 is keyed in the usual manner to the rotary valve 220, the connection being one permitting relative axial movement therebetween, so that a spring 236 acts to assist in holding the rotary valve upon its seat.

The communications established by the rotary valve for the various positions shown in Fig. 3 are diagrammatically indicated in Fig. 4. In release position of the brake valve handle 155, a port 237 in the rotary valve connects the feed valve pipe 63 (which is at all times in open communication with the rotary valve chamber 238) with the brake pipe 41 and also with the equalizing reservoir pipe 150. Also in the release position, a pipe 239, which leads to a reduction limiting reservoir 240, is connected to an exhaust port 241 by a port 242 in the rotary valve.

With the brake valve handle 155 in the first service position, a port 243 in the rotary valve connects pipe 148, leading to the vent valve in the equalizing discharge valve device 24, to the exhaust port 241. At the same time, a restricted port 244 in the rotary valve connects the equalizing reservoir pipe 150 with the reduction limiting reservoir pipe 239.

In the lap position of the brake valve handle, the only communication established is between the exhaust passage 241 and the equalizing discharge valve exhaust pipe 148, by means of a port 232 in the rotary valve.

In the full service position of the brake valve handle, the only communications established are that between the exhaust passage 241 and the equalizing discharge valve exhaust pipe 148, by a rotary valve port 245, and that between the equalizing reservoir pipe 150 and the exhaust passage 241, by a small or restricted rotary valve port 246.

In the emergency position of the brake valve handle, the only communication established by the rotary valve is that between the exhaust passage 241 and the pipe 148, through a port 247 in the rotary valve.

Fig. 4 also shows in diagrammatic form the rise of the surface of cam 204 with respect to the various brake valve handle positions, thus indicating that the pressure in the chamber 202 progressively increases from minimum to a maximum as the handle is moved from release to emergency position.

When the brake valve handle 155 is turned to the emergency position, regardless of what position the section 186 may be in, a shoulder 250 on the member 163 (see Fig. 7) will strike a plunger 251 to effect the unseating of a brake pipe vent valve 252, for the purpose of venting the brake pipe to the atmosphere at an emergency rate and thereby effect an emergency application of the brakes.

The vent valve 252 is urged toward a seat 253 by a spring 254. Carried by the vent valve 252 is a pilot valve 255. This pilot valve is uged toward a seated position by a smaller spring 256. A chamber 257 to the right of the valve 252 is connected by way of a restricted port 258 to a chamber 259, which as shown in Fig. 2, is in communication with the brake pipe 41 by way of passage 260. When the brake pipe is charged the chamber 257 is therefore at brake pipe pressure.

When the brake valve handle 255 is turned to the emergency position and the plunger 251 thereby actuated, the pilot valve 255 is first unseated. Unseating of this valve opens a communication between the chamber 257 and a chamber 261 which is normally open to the atmosphere. Fluid under pressure in the chamber 257, which before was, together with the two springs 256 and 254, effective in holding the valve 252 upon its seat, is thus released to the atmosphere, thereby unloading the valve 252. The force necessary to unseat the valve 252 is thereby greatly diminished so that the operator may with a light pressure applied to the handle 155 readily unseat the valve. When the pilot valve 255 is unseated the choke 258 limits the flow of fluid to the chamber 257 sufficiently for the unloading to be effectively accomplished.

In case it is desired to incorporate a sanding feature in the brake valve device 32, a sanding bail 263 may be added as shown in Fig. 3. This bail is pivotally mounted at 264, and is normally retained in a horizontal position (see Fig. 2) by a spring acting upon a normally seated valve, the stem of which presses upwardly against the bail, as indicated at 265. When sanding is desired the handle 155 is depressed below its horizontal position, as illustrated in Fig. 2, being thus depressed against the combined opposition of the two springs 166, whereupon the sanding valve is unseated to supply fluid under pressure to a sanding device, as is well understood in the art. As will be observed in Fig. 3, sanding may be accomplished in any position of the brake valve handle.

A feature of my improved brake valve device of practical importance is that the arrangement shown and described provides for movement of the brake valve handle from one position to another with the application of only a very light force. In order that the force necessary to thus move the handle will not be increased with time, I have arranged the parts so that they may be readily kept lubricated. In the upper part of the brake valve casing I have provided a chamber which may be filled with a porous lubrication retaining material 266, such for example as felt, wool or the like, and have provided a small plug 267 for admitting oil to this chamber. As may be seen particularly from Fig. 2, oil in this chamber will be supplied to the rotating parts and will pass downwardly and be caught by an oil retaining member 268. Similar oil retaining members are also shown at 269, just above the cam 204, and at 270 just below the rotatable member 218. Oil grooves 271 lead from this latter member to the bearing surfaces of the sleeve 234.

As before stated, the brake valve handle 155 is removable. This may, however, be accomplished only when the handle is in the lap position. For all other positions of the handle, segments 272 (see Fig. 3) prevent removal of the handle, but in lap position an open space is provided between the segments so that the handle may be tipped upwardly and by proper manipulation removed from its operating position.

When the brake valve device is operating to control straight air applications it is desirable that the movement of the handle be accomplished smoothly, but when operating to control automatic application, the various positions are more readily found if the quadrant is "notched". To provide for this the rotatable member 218, which is as before described operative only when the selector 186 is in automatic position, has a number of notches 273 disposed on its periphery, these notches corresponding to the various brake valve handle positions. A spring pressed plunger 274 is adapted to engage these notches, so that as the brake valve handle arrives at any one of the several positions the operator is immediately aware of the fact by the slight arresting action of the plunger.

When the brake valve is operating as an automatic brake valve, that is when the selector 186 is in automatic position, the cam 204 may for some reason unintentionally rotate with the shaft 184. To insure that the cam is always returned to its release position when the brake valve handle is returned to release position, a pin 275 (see Figs. 5 and 9) projects from a sleeve of the cam 204 in a manner such that it will strike the upper lug 214 of the sleeve member 206, and thus return the cam 204 to release position as the shaft 184 is rotated to release position. A second pin 276 projecting from the cam 204 prevents overtravel of the cam beyond release position.

When the selector device 186 is in the straight air position, that is when the brake valve is operable as a straight air brake valve, to insure that the charging of the brake pipe will be discontinued when the brake valve handle reaches emergency position and thereby operates the vent valve 252 to vent the brake pipe, the rotatable member 218 is provided with a segmental projection 277 (see Fig. 12) having a face 278, which is engaged by the lower lug 215 on the sleeve 206. This engagement takes place just before the brake valve handle reaches emergency position and shifts the rotary valve to lap position where the brake pipe 41 is disconnected from the feed valve pipe 63. To insure that the charging connection will be reestablished when the brake valve handle is returned to release position, the segmental projection 277 is arranged so that the lug 215 will strike the face 279 and return the rotary valve to its normal release position to reestablish the charging connection.

The operation of this embodiment of my invention is as follows:

Running condition

Assuming a single vehicle equipped with the apparatus illustrated in Fig. 1 and that the main reservoir 64 is charged with fluid under pressure, the equipment will be charged as follows:

From the main reservoir fluid under pressure will flow to the timing reservoir 93 by way of main reservoir pipe 92 and past the lower seat of the double beat valve 86 in the relay valve device 25. The timing reservoir will thus be charged to main reservoir pressure.

From the feed valve device 62 fluid under pressure will flow to the rotary valve chamber 238 in the brake valve device 232. From this chamber fluid under pressure will flow to and charge the brake pipe 41 as well as the equalizing reservoir 151 and the chamber 138 in the equalizing discharge valve device 24.

From the brake pipe 41 fluid under pressure will flow to piston chamber 35 in the automatic valve device 21, and from this chamber to the emergency reservoir 44 past the check valve 45, and to the auxiliary reservoir 42 by way of feed groove 43. Also, fluid under pressure will flow from the brake pipe 41 to the piston chamber 101 in the emergency valve device 22, from whence it will flow by way of passage 280 to both the slide valve chamber 102 and the quick action chamber 103.

The brake equipment will then be maintained charged and with the brake valve handle 155 maintained in release position, the parts will be in the positions illustrated.

It will be noted that the timing switch device 28 is subject to timing reservoir pressure and will as a consequence maintain the contact 84 out of engagement with the contacts 85. The application insuring magnet valve device 29 will then be deenergized.

Straight air application

Assuming now that it is desired to effect a straight air application of the brakes, the operator makes certain that the selector device 186 is in the straight air position. To effect the application then the brake valve handle 155 is moved from release position toward the full service position to a degree of extent according to the desired degree of application of the brakes, that is, the degree of angular movement of the handle determines the degree of the application.

With the selector device 186 in the straight air position, the self-lapping portion of the brake valve device only will be affected. This valve mechanism will supply fluid under pressure from the feed valve device 62 to pipe 281, and fluid under pressure in this pipe will flow to the double check valve 124, shifting the valve therein to upper position, and from thence flowing to control pipe 71. From control pipe 71 fluid will flow to chamber 70 in the master switch device 26 and also to chamber 88 in the relay valve device 25.

Fluid under pressure in the chamber 70 will operate the switch device to in turn effect operation of the application and release magnet valve device 27, as before described, to establish a brake cylinder pressure corresponding to the pressure in the chamber 70. Since the pressure in the chamber 70 corresponds to the degree of brake valve handle movement, it follows that the brake cylinder pressure will also correspond to this same movement.

Fluid under pressure flowing to the chamber 88 in the relay valve device 25, actuates the diaphragm 89 downwardly to shift the double beat valve 86 from upper seated position to lower seated position. Timing reservoir 93 will then be connected to the atmosphere by way of the restricted port 94. The parts are so designed that if the application and release magnet valve device 27 is effective in building up straight air pipe pressure as rapidly as desired, then before the pressure in the timing reservoir will have reduced sufficiently for the pneumatic switch device to close the contacts 85, straight air pipe pressure will have shifted the double check valve 95 and will then operate to maintain the contacts 85 open.

If, however, straight air pipe pressure should not be developed in the desired time, then when the timing reservoir pressure has fallen below a predetermined value the pneumatic switch device 28 will close its contacts 85, and thus energize the application insuring magnet valve device 29. This valve device will establish communication between the brake pipe 41 and the atmosphere, as before described, and thus effect an emergency application of the brakes in a manner to be more fully described hereinafter.

It will thus be seen that by the employment of a single pneumatic switch and a simple timing mechanism an application of the brakes by automatic operation is insured in the event that the application by straight air operation does not materialize as desired.

The degree of the application may be increased by moving the brake valve handle further towards the full service position, and may be decreased by moving the handle toward the release position. When it is desired to effect a full release of the brakes, the brake valve handle is returned to the release position, whereupon fluid under pressure supplied to the control pipe 71 and switch chamber 70 is released to the atmosphere past the release valve 190 in the self-lapping valve portion of the brake valve device. The parts will then return to the release position illustrated in Fig. 1, thus venting the brake cylinder 20 to the atmosphere.

Automatic service application

When it is desired to effect an application of the brakes by automatic operation, the selector 186 is turned to the automatic position. If the brake equipment has been adapted to a train comprising a relatively large number of cars, it may be desirable when effecting an automatic application to first move the brake valve handle to the first service position, in which position the rotary valve disconnects the brake pipe 41 and the equalizing reservoir 151 from the feed valve pipe 63, while port 243 in the rotary valve connects the pipe 148 to exhaust passage 241, and restricted port 244 in the rotary valve connects the equalizing reservoir 151 to the reduction limiting reservoir 240. Fluid under pressure in the equalizing reservoir 151 and piston chamber 138 of the equalizing discharge valve device 24 will then flow to the reduction limiting reservoir until equalization takes place. The consequent reduction of pressure in the piston chamber 138 is intended to be sufficient to effect a very moderate reduction only in brake pipe pressure. This low reduction in brake pipe pressure is preferably just sufficient to gather the slack in the train, and is preliminary to making a normal application.

If after the brake valve handle has been thus moved to the first service position, it is now moved to the full service position, another port 245 in the brake valve maintains the pipe 148 connected to the exhaust passage 241, while a second restricted port 246 connects the equalizing reservoir 151 also to the exhaust passage 241. The operator leaves the brake valve handle in the full service position until a desired reduction of pressure has been effected in the equalizing reservoir 151. He then turns the brake valve handle to the lap position. The further reduction in equalizing reservoir pressure effects operation of the equalizing discharge valve device, as previously described, to effect a corresponding reduction in brake pipe pressure at a service rate.

When either a small or a large reduction in brake pipe pressure is effected at a service rate, a corresponding reduction takes place in the piston chamber 35 in the automatic valve device 21. As a consequence, the piston 34 is shifted to service position so that fluid under pressure is supplied from the auxiliary reservoir 42 to the brake cylinder 20, by way of the double check valve device 49. The automatic valve device 21 will, of course, move to lap position when brake cylinder pressure corresponds substantially to the degree of reduction in brake pipe pressure.

During this operation the emergency valve device 22 responds only to reduce the pressure in slide valve chamber 102 and 103 sufficient to prevent the parts from being moved to application position, as before described.

It will be obvious that the degree of the brake application is controlled according to the degree of reduction in equalizing reservoir pressure, and that by employment of the equalizing reservoir 151 and the equalizing discharge valve device 24, a graduated control of the application is readily possible.

To effect a release of the brakes following an automatic service application, the brake valve handle 155 is returned to the release position, whereupon the brake pipe 41 is recharged from the feed valve pipe 63, and the parts of the automatic valve device 21 return to release position. In this position of the valve device the brake cylinder 20 is connected to the exhaust port 50, by means of the cavity 51 in the slide valve 40.

*Emergency application*

An emergency application of the brakes may be effected manually in one of three different ways. The usual manner is to turn the brake valve handle 155 to the emergency position, and regardless of whether the selector 186 is in the automatic or the straight air position an emergency application will result. A second way in which an emergency application may be effected is to release the pressure manually applied to hold the brake valve handle 155 in the horizontal position. It is to be understood that the brake valve handle is manually held in the horizontal position at all times while the train is running and while normal service applications of the brakes are being effected. A third way to effect an emergency application is by operation of the lever 154 of the conductor's valve device 30 to vent the brake pipe 41.

Referring now to the first of these methods, when the brake valve handle 155 is turned to the emergency position, the brake pipe vent valve device 252 is unseated in the manner before described to vent the brake pipe directly and rapidly to the atmosphere. The reduction in brake pipe pressure which takes place is at an emergency rate, so that the emergency valve device 22 functions to connect the emergency reservoir 44 to the pipe and passage 114, and to open the vent valve 118 to further reduce brake pipe pressure. If the brake valve device 32 is conditioned for straight air operation, it will supply fluid under pressure to the pipe 281 to the maximum degree. If the brake valve device is conditioned for automatic operation, fluid under pressure will not be supplied to the pipe 281.

Regardless of whether or not fluid under pressure is supplied to the pipe 281, it is intended that the pressure of the supply from the emergency reservoir 44 will predominate, so that the double check valve device 124 will open communication from the pipe and passage 114 to the control pipe 71, so that an electropneumatic application of the brakes will be effected to a maximum degree. That is, the application and release magnet valve device 27 will supply fluid under pressure to the straight air pipe 60 to the maximum permissible degree.

At the same time, the automatic valve device 21 will respond to the emergency reduction in brake pipe pressure to supply fluid under pressure from the auxiliary reservoir 42 to pipe and passage 48. It is intended that the pressure of fluid in the straight air pipe 60 shall exceed that which may be supplied from the auxiliary reservoir 42, so that the double check valve device 49 will open communication from the straight air pipe to the brake cylinder 20.

Now, when the brake valve handle is turned to the emergency position, it is desirable that the brake pipe 41 be disconnected from the feed valve pipe 63, so as to prevent unnecessary loss of fluid pressure. If the brake valve device is conditioned for automatic operation, this is taken care of when the rotary valve 220 is in the emergency position. If the brake valve device is, however, conditioned for straight air operation, the rotary valve is not rotated coextensive with the brake valve handle, but nevertheless when the brake valve handle is turned to the emergency position the lug 215 engages the face 278 of the shoulder 277 on the rotatable member 218 to shift the rotary valve 220 to the lap position, where communication between the brake pipe 41 and feed valve pipe 63 is cut off.

To release the brakes following this type of an emergency application, the brake valve handle is returned to release position, whereupon the charging communication to the brake pipe is reestablished, and as the brake pipe pressure rises to its normal value the parts will return to the release position illustrated.

To effect an emergency application by releasing the brake valve handle 155, when this handle swings upwardly it unseats the vent valve 178, to vent the safety control pipe 133. This results in a reduction of pressure in the safety control pipe 133 and the piston chamber 126 of the safety control vent valve device 23, whereupon the piston 125 in this device is actuated upwardly to disconnect the brake pipe 41 from the charging pipe 132 and to vent the brake pipe to the atmosphere at an emergency rate. From this point on the application is substantially as described for the first type of emergency application.

To release the brakes following a safety control emergency application, pressure is again manually applied to the brake valve handle to return it to its horizontal position. The spring 127 in the safety control vent valve device 23 will have seated the valve 130 following reduction of brake pipe pressure substantially to atmospheric pressure, so that with the brake valve handle in release position the brake pipe will be recharged to effect the release.

To effect an emergency application by operation of the conductor's valve device 30, the lever 154 of this device is rotated in a clockwise direction, thereby unseating a valve within the valve device to vent the brake pipe to the atmosphere at an emergency rate. An emergency application will therefore result in substantially the same manner as when venting the brake pipe by the other means previously described. However, when effecting an application by this means, unless the operator immediately turns the brake valve handle 155 to lap position, some loss of main reservoir pressure will result due to the fact that the brake pipe 41 is maintained connected to the feed valve device 62 through the safety control vent valve device 23 and the brake valve 32.

While I have described my invention with particular reference to a specific embodiment thereof, it is not my intention to be limited to the exact details of this embodiment, or otherwise than by the spirit and scope of the appended claims.

Having now described my invention, what I claim as new and desire to secure by Letters Patent, is:

1. In a vehicle brake system, in combination, a brake equipment comprising a straight air portion and an automatic portion, a brake valve device having a mechanism for controlling said straight air portion and a separate mechanism for controlling said automatic portion, and selective means movable between two positions to render one or the other of said two brake valve mechanisms effective in controlling said brake equipment.

2. In a vehicle brake system, in combination, a brake equipment comprising a straight air portion and an automatic portion, a brake valve device having a first valve means for controlling said straight air portion and a second valve means for controlling said automatic portion, and a selector for rendering one or the other of said two valve means effective in controlling one of the portions of said braking equipment.

3. In a vehicle brake system, in combination, a brake equipment comprising a straight air portion and an automatic portion, a brake valve device having a self-lapping valve means for controlling said straight air portion and a rotary valve means for controlling said automatic portion, and a selector device for rendering at one time said self-lapping valve means effective in controlling said straight air portion and at another time for rendering said rotary valve means effective in controlling said automatic portion.

4. In a vehicle brake system, in combination, a brake equipment comprising a straight air portion and an automatic portion, a brake valve device having a self-lapping valve mechanism and a rotary valve mechanism, and selective means operable in one position to render said self-lapping valve means effective to control the straight air portion of said brake equipment and in a different position to render said rotary valve means effective in controlling said automatic portion of said brake equipment.

5. In a vehicle brake system, in combination, a brake equipment comprising an electropneumatic portion and an automatic portion, a brake valve device having a first control mechanism for controlling said electropneumatic portion and a second control mechanism for controlling said automatic portion, and a clutch means shiftable between two positions to render one or the other of said last mentioned control mechanisms effective in controlling said brake equipment.

6. In a vehicle brake system, in combination, a brake equipment comprising an electropneumatic portion and an automatic portion, a brake valve device having a self-lapping valve means for controlling said electropneumatic portion and a rotary valve means for controlling said automatic portion, and a clutch mechanism shiftable between two positions and operative in one of said two positions to render said self-lapping valve means operative and said rotary valve means inoperative, and in the other of said two positions to render said rotary valve means operative and said self-lapping valve means inoperative.

7. In a vehicle brake system, in combination, a brake equipment comprising a normally discharged pipe through which fluid under pressure is supplied to effect a straight air application of the brakes, and further comprising a normally charged pipe in which the pressure of fluid therein is reduced to effect an automatic application of the brakes, a brake valve device having a first valve means for effecting a supply of fluid under pressure to said normally discharged pipe and a second valve means for effecting a reduction of pressure in said normally charged pipe, and a clutch mechanism operative between two positions to render one or the other of said two valve means effective when said brake valve device is operated to effect an application of the brakes.

8. In a vehicle brake system, in combination, a pipe to which fluid under pressure is supplied to effect a straight air application of the brakes, a normally charged equalizing reservoir in which the pressure of fluid is varied to effect an automatic application of the brakes, a brake valve device having a self-lapping valve means for supplying fluid under pressure to said pipe and a rotary valve means for varying the pressure of fluid in said equalizing reservoir, and clutch means operative in one of two positions to render said self-lapping valve means effective to supply fluid under pressure to said pipe while rendering said rotary valve means ineffective to vary the pressure in said equalizing reservoir, and operative in the other of its two positions to render said rotary valve means effective in varying the pressure in said equalizing reservoir while rendering said self-lapping valve means ineffective to supply fluid under said pipe.

9. In a vehicle brake system, in combination, a switch mechanism to which fluid under pressure is supplied to effect an electropneumatic application of the brakes, an equalizing discharge valve device operative to control automatic applications of the brakes, a brake valve device having a first valve section for controlling the supply of fluid under pressure to said switch device and a second valve section for controlling the operation of said equalizing discharge valve device, and a clutch mechanism operative in one position to render said first valve means only effective and operative in a second position to render said second valve means only effective.

10. In a vehicle brake system, in combination, a brake equipment comprising a straight air portion, an automatic portion and a safety control portion; a brake valve device having a self-lapping valve mechanism for controlling said straight air portion, a rotary valve mechanism for controlling said automatic portion, and a handle for operating said two valve mechanisms, said handle being so constructed and arranged as to be normally held in a given plane by pressure manually applied by an operator and adapted to be rotated to a different plane upon release of said pressure by the operator; a clutch mechanism operable between two positions to render one or the other of said valve mechanisms responsive to movement of said handle in its normal plane; and valve means responsive to movement of said handle from said normal plane to said different plane for controlling said safety control portion.

11. In a brake valve device, in combination, a self-lapping valve mechanism, a rotary valve mechanism, an operating handle, and means including a clutch device for rendering one or the other of said self-lapping valve means and rotary valve means responsive to movement of said handle.

12. In a brake valve device, in combination, self-lapping valve means, rotary valve means, a controlling handle, and selective means operative on one of two positions to render said self-lapping valve means only responsive to movement of said handle and operative in the other of its two positions to render said rotary valve means only responsive to movement of said handle.

13. In a brake valve device, in combination, a self-lapping valve means, a rotary valve means, a brake controlling handle movable in a predetermined application zone, and a clutch device operative in one of two positions to render said self-lapping valve means only responsive to movement of said handle in said application zone, and operative in the other of its two positions to render said rotary valve means only responsive to movement of said handle in said same application zone.

14. In a brake valve device, in combination, self-lapping valve means, rotary valve means, a handle movable in an application zone between a release position and a full service position, and movable beyond said full service position to an emergency position, means including a clutch device operable in one position to render said self-lapping valve means only responsive to movement of said handle in said application zone and also in said emergency position, said clutch device rendering said rotary valve means unresponsive to movement of said handle when in said one position, and means operative while said clutch device is in said one position for operating said rotary valve means when said handle is moved to said emergency position only.

15. In a brake valve device, in combination, a self-lapping valve means, a rotary valve means, a handle movable in a service application zone and also movable beyond said zone to an emergency position, means including a clutch device operable in one position to render said self-lapping valve means only responsive to movement of said handle in said zone and to said emergency position, and operable in another position to render said rotary valve means only responsive to movement of said handle in said application zone and to said emergency position, said rotary valve means being operative in its release position to establish a charging connection for a brake pipe, and means operable when said clutch device is in the position for rendering said self-lapping valve means only responsive to movement of said handle for actuating said rotary valve means to close said charging connection when said handle is turned to said emergency position.

16. In a brake valve device, in combination, a self-lapping valve means, a rotary valve means, a rotatable shaft for operating one or the other of said two valve means, a clutch device operable in one of two positions to render said self-lapping valve means only responsive to rotation of said shaft, and operable in the other of its two positions to render said rotary valve means only responsive to rotation of said shaft, and selective means for shifting said clutch device between its two positions.

17. In a brake valve device, in combination, a self-lapping valve means, a cam for operating said self-lapping valve means, a rotary valve means, an operating shaft adapted to be rotated, a clutch device for connecting said shaft to said cam in one position and for connecting said rotary valve means to said shaft in a different position, and means for insuring the correct positioning of said cam with respect to said self-lapping valve means before effecting the clutch engagement of said cam with said shaft.

18. In a brake valve device, in combination, a self-lapping valve means, a rotary valve means, a handle movable to a plurality of operative positions, means including a clutch device operative in one of two positions to render said self-lapping valve means only responsive to movement of said handle and operative in the other of its two positions to render said rotary valve means only responsive to movement of said handle, and means associated with said rotary valve means only for producing a slight arresting effect to movement of said handle in each of said operating positions, whereby to inform the operator when said handle is in each of said operating positions.

19. In a brake valve device, in combination, self-lapping valve means for controlling straight air applications of the brakes, rotary valve means for controlling automatic applications of the brakes, safety control valve means for controlling safety control applications of the brakes, a handle movable to different positions in a horizontal plane and adapted upon the release of pressure manually applied thereto to swing from said horizontal plane to an angular plane, means including a clutch device operative in one of two positions to render said self-lapping valve means only responsive to movement of said handle in said horizontal plane, and operative in the other of its two positions to render said rotary valve means only responsive to movement of said handle in said horizontal plane, and means responsive to movement of said handle from said horizontal plane to said angular plane, regardless of the position of said handle in said horizontal plane at the time, for effecting the operation of said safety control valve means.

20. In a brake valve device, in combination, a self-lapping valve means, a rotary valve means, a brake controlling handle, means including a clutch device operative in one of two positions to render said self-lapping valve means only responsive to movement of said handle, and operative in the other of its two positions to render said rotary valve means only responsive to movement of said handle, emergency valve means, and means operative in response to movement of said handle to a predetermined emergency position for operating said emergency valve means regardless of the position of said clutch device.

21. In a brake valve device, in combination, a handle, means providing for both horizontal and vertical movements of said handle, a first spring means urging said handle from a horizontal position toward a vertical position, said handle being adapted to be held in a horizontal position by pressure manually applied by an operator to overcome said first spring means, and a second spring means effective to exert a force on said handle only when said handle is moved below said horizontal position.

22. In a brake valve device, in combination, a self-lapping valve means, a rotary valve means, an operating shaft, a clutch device operative in one of two positions to operatively engage said self-lapping valve means with said shaft and operative in the other of its two positions to operatively engage said rotary valve means with said shaft, a selector handle operable between two positions to shift said clutch between its two positions, and means for retaining said selector handle in either of its two positions.

23. In a vehicle brake system, in combination, a brake equipment, a single brake valve device having a single operating handle and a plurality of valve mechanisms operative in response to movement of said handle, and selector means movable to a plurality of positions and operable in each position to render one only of said valve mechanisms effective in controlling applications of the brakes.

24. In a vehicle brake system, in combination, a brake equipment comprising a straight air portion and an automatic portion, a single brake valve device having a single operating handle and two separate valve mechanisms each of which is operable in response to movement of said handle, and selector means movable between two positions and operable in one position to render one only of said two valve mechanisms responsive to movement of said handle, and operable in the other of said two positions to render the other only of said valve mechanisms responsive to movement of said handle.

25. In a brake valve device, in combination, a plurality of separate valve mechanisms, an operating handle, and a clutch mechanism having two positions and being operable in one of said two positions to render one only of said valve mechanisms responsive to movement of said operating handle, and operable in the other of said two positions to render the other only of said valve mechanisms responsive to movement of said handle.

26. In a brake valve device, in combination, two separate and distinct valve mechanisms, an operating handle, and a clutch mechanism having two operating positions, and being operable in one of said positions to render one only of said two valve mechanisms responsive to movement of said operating handle, and being operative in the other of said two positions to render the other only of said two valve mechanisms responsive to movement of said operating handle.

27. In a vehicle brake system, in combination, a brake equipment comprising a straight air portion and an automatic portion, a brake valve device having a valve mechanism for controlling said straight air portion and a separate valve mechanism for controlling said automatic portion, and selector means movable between two positions to render one or the other of said two valve mechanisms actuable in controlling said brake equipment.

ELLIS E. HEWITT.

CERTIFICATE OF CORRECTION.

Patent No. 2,106,483.  January 25, 1938.

ELLIS E. HEWITT.

It is hereby certified that error appears in the printed specification of the above numbered patent requiring correction as follows: Page 10, first column, line 46, for "on" read in; and that the said Letters Patent should be read with this correction therein that the same may conform to the record of the case in the Patent Office.

Signed and sealed this 15th day of March, A. D. 1938.

Henry Van Arsdale,
Acting Commissioner of Patents.

(Seal)